United States Patent [19]

Bellmann et al.

[11] 4,396,320

[45] Aug. 2, 1983

[54] BORING UNIT

[75] Inventors: Bernhard G. Bellmann, Pfungstadt; Wilfried Horsch, Obrigheim; Wilhelm Wolf, Laudenbach, all of Fed. Rep. of Germany

[73] Assignee: Santrade Ltd., Lucerne, Switzerland

[21] Appl. No.: 232,029

[22] PCT Filed: May 22, 1980

[86] PCT No.: PCT/DE80/00074

§ 371 Date: Jan. 30, 1981

§ 102(e) Date: Jan. 30, 1981

[87] PCT Pub. No.: WO80/02660

PCT Pub. Date: Dec. 11, 1980

[30] Foreign Application Priority Data

May 30, 1979 [DE] Fed. Rep. of Germany ....... 2921961

[51] Int. Cl.³ .................. B23B 47/00; B23B 47/18
[52] U.S. Cl. .................. 408/156; 408/159; 408/172; 408/182
[58] Field of Search .......... 408/56, 159, 160, 161, 408/135, 136, 172, 180, 156, 168, 154, 239 R, 238, 239; 409/231, 233, 135, 136

[56] References Cited

U.S. PATENT DOCUMENTS

| 3,120,765 | 2/1964 | Briney et al. | 408/154 |
| 3,583,280 | 6/1971 | Hart | 409/233 |
| 3,744,924 | 7/1973 | Levosinski et al. | 408/156 |
| 3,749,508 | 7/1973 | Schukrafft | 408/156 |
| 3,753,624 | 8/1973 | Walker et al. | 408/159 |

FOREIGN PATENT DOCUMENTS 659294 4/1979 U.S.S.R. ............... 409/233

Primary Examiner—William R. Briggs
Assistant Examiner—Thomas M. Kline
Attorney, Agent, or Firm—Burns, Doane, Swecker & Mathis

[57] ABSTRACT

A boring unit comprises a rotary spindle and a tool support mounted therein. The tool supports includes a rearwardly extending headbolt and a rearwardly extending supporting arm. The supporting arm engages an inclined wedge surface, the latter being movable by a connecting rod so that the wedge surface imparts rotary movement to the supporting arm and to the tool support about an axis of adjustment which is oriented perpendicular to the axis of rotation of the spindle, thereby moving the tool in a radial direction. The headbolt of the tool support is retained within a chucking cage. The chucking cage is movable to a position for releasing the headbolt by means of the movable connecting rod.

7 Claims, 1 Drawing Figure

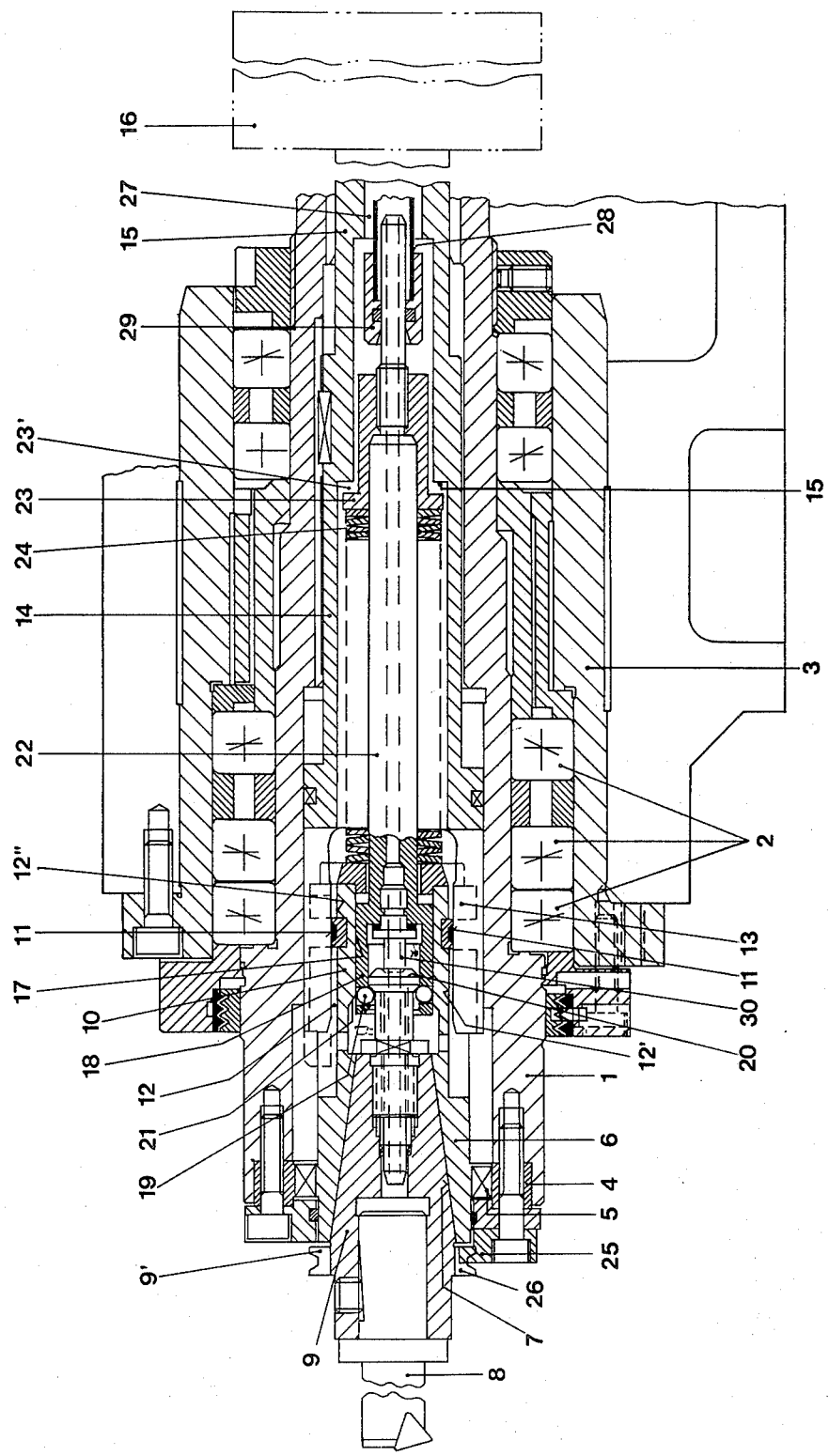

BORING UNIT

The invention relates to a boring unit with a rotatably driven bored tool spindle for exchangeably receiving a boring tool in a tool carrier tiltable perpendicularly to the axis of the tool spindle, which is supported by a support arm on a slightly oblique wedge surface of an adjustment member axially slidable in the tool spindle by means of a connecting rod.

In a known boring unit of such type (DE-OS No. 2,040,020), the boring tool is screwed and centered on the face of the tool support which simultaneously serves for tool receiving. For an exchange, the boring tool must be unscrewed from the tool support. A faster or even fully automatic tool exchange is not possible with same.

In known fully automatic tool exchange devices, the tool is provided with a taper which is held in a taper socket by a headbolt mounted on the taper. Balls arranged in a ring-shaped array, which are movable by a chucking cage axially along an oblique surface disposed in the spindle bore, pull the headbolt inwardly when the chucking cage is pulled back by the action of a tension spring. In order to loosen this chucking of the headbolt, the chucking cage is moved forward by means of a connecting rod arranged in the bored spindle until the balls release the headbolt.

In this known headbolt chucking the space available in the spindle bore is required for the parts of the headbolt chucking; in the known boring unit mentioned at the outset, the spindle bore is required for receiving the support arm, the axially slidable adjustment member and the connecting rod connected with same, in order to provide for the desired tilting motion of the boring tool. Only the face is available for the exchangeable attachment of the boring tool to the tool support.

Thus, it is an object of the invention to so structure a boring unit of the type mentioned at the outset, that a fully automatic tool exchange can follow without impairing the tilting motion of the boring tool or necessitating an engagement at the forward end of the spindle for release or chucking of the tool.

According to the invention, this object is so solved that the boring tool is arranged for being chucked in the tool support by means of a headbolt chucking through balls, which are movable along an oblique surface by a chucking cage axially slidable in a bore of the supporting arm, and that the connecting rod, tilting at the end of its axial stroke, the adjusting member and the tool support, enters into engagement, over a stop means, with the chucking cage maintained in its chucked position by tension springs, and axially shifts same for release of the headbolt.

The parts of the headbolt chucking are thus accommodated in the interior of the supporting arm. For the actuating of the headbolt chucking, the connecting rod is used which also axially shifts the adjustment member provided with the wedge surface. At the end of its adjustment stroke, the connecting rod can be brought over a stop means, into engagement with the chucking cage of the headbolt chucking in order to release the headbolt chucking. When this engagement is again released, the headbolt is again chucked. In this way, a fully automatic tool exchange can be achieved even in a boring unit with a boring tool tiltable sidewise for radial adjustment of the cutting edge, whereby even a separate actuating device for the release of the tool is not necessary. No engagement at the forward spindle end is required for the process of the chucking or releasing of the boring tool, which would be time consuming and complicated. At the forward spindle end only the boring tool to be exchanged is gripped and withdrawn and another boring tool inserted.

Due to the very small space requirement of the parts required for the tool chucking according to the invention, it is possible in a structurally very simple way to provide in the connecting rod and in further parts attached to the boring tool a central coolant conduit.

Further embodiments of the inventive concept are the subject of dependent claims.

In the following, the invention will be explained more fully with reference to an exemplary embodiment which is shown in the drawing.

The drawing shows a partial longitudinal section of a boring unit. A bored tool spindle 1 is mounted for rotation in a housing 3 on spindle bearings 2. A rotary drive engaging the rear end of the tool spindle 1 is not shown in the drawing.

At the forward spindle end is flanged a support ring 4 which is connected with a tool support 6 by two mutually opposite torsion rods 5 (in the drawing displaced by 90° in the plane of the drawing), which support 6 is provided with a tapered socket 7. In the taper socket 7 is seated a taper 9 connected with a boring tool 8. The tool support 6 is produced integral with a support arm 10 which rests, across slide member 11, on two mutually opposite wedge surfaces 12, 12'.

The wedge surfaces 12, 12' are slightly oblique with respect to the longitudinal axis of the spindle, for instance at an angle of 1°, and are formed on a fork-shaped adjustment member 13 which is longitudinally slidable in the interior of the spindle 1. The adjustment member 13 is provided with a tubular extension 14 connected with a tubular connecting rod 15 which extends through the spindle 1 and outside of the rear spindle end. The rod 15 is connected to an adjustment device 16, indicated by phantom lines in the drawing, by which the connecting rod 15 can be positioned between axial positions that can be exactly predetermined.

The axial displacement of the adjustment member 13 serves the purpose of tilting the tool support 6 about the torsion rods 5 and thus to provide a radial adjustment of the cutting tip of the boring tool 8, for instance as follows:

When the adjustment member 13 is moved backwards from its starting position shown in the drawing, i.e., to the right in the drawing, the tool support 6 pivots about the torsion rods 5 counterclockwise so that the cutting tip of the boring tool 8 is brought into the radial position required for the boring process. When the boring process is finished, the adjustment member 13 is again driven forward by the connecting rod 15 into the starting position shown in the drawing, whereby the cutting tip of the boring tool 8 is taken off the machined surface for return movement.

Alternatively, the boring tool 8 can also be so produced that in the position shown in the drawing it bores into the full material or performs rough machining of the bore. At the end of this working process, the tool support 6 is swung by the backward pull of the adjustment member 13, whereby the cutting tip of the bored tool is displaced radially outwardly. In this position, fine machining of the bore results upon retraction.

This described pivoting of the tool support 6 with the boring tool 8 results in the machining of each bore, i.e., often successively, without exchanging the boring tool. By the axial positioning of the adjustment member 13, the radial adjustment of the boring tool can then be so influenced that a measured or predetermined cutting wear of the boring tool arising while machining is compensated for.

In a bore 17 of the support arm 10 there is an axially movable chucking cage 18 which holds a ring of chucking balls 19 which, in the chucked position shown in the drawing, hold a headbolt 20 connected with the rear end of the taper 9. On axial movement of the chucking cage 18 forwards, the balls 19 are moved along an annular oblique surface 21 and can thus move so far radially outwardly that they release the headbolt 20.

The chucking cage 18 is connected with an axial tie rod 22 having at its rear end a spring abutment 23 on which rests a tension spring 24 in the form of a plate spring package which engages at its other end the rear end of the support arm 10. The tension spring 24 pulls the tie rod 22 and therwith the chucking cage 18, the balls 19 and the headbolt 20 rearwards and thus holds the taper 9 in the taper socket 7.

When the boring tool 8 is to be exchanged, for instance when the cutting edge wear becomes too great after the machining of an number of bores or when a different boring tool needs to be used, the connecting rod 15 is moved forwardly over its axial position shown in the drawing. The connecting rod 15 enters at its face 15' into engagement with a rear stop surface 23' of the spring bearing 23 and displaces the tie rod 22 against the force of the spring 24 forwardly, to release the headbolt 20.

The wedge surface 12 changes at its rear end into axially parallel surface 12". When the surfaces 15' and 23' enter into engagement, the upper slide member 11 of the support arm 10 is disposed in the region of the surface 12". On a further axial movement of the connecting rod 15 forwards, the supporting arm 10 and thus the boring tool 8 is not moved further; this further axial movement of the connecting rod 15 only serves the purpose of displacing the chucking cage 18 for release of the headbolt 20, so that the boring tool 8 with its taper 9 and the headbolt 20 can be gripped by a tool exchange device by a flange 9' and exchanged.

The tool exchange takes place while the tool spindle 1 stands still at a predetermined, fixed pivot position so that the boring tool can be inserted always in the same position of its cutting edge relative to the wedge surfaces 12, 12' and the torsion rods 5, respectively. At the face of the tool spindle 1 there is provided a coupling block 25 that engage a recess 26 on the flange 9'.

The connecting rod 15 contains in a bore 27 a coolant pipe 28 which is connected by means of a telescope-like conduit connection 29 with the bored tie rod 22. Through a further telescope-like conduit connection 30, the tie rod 22 is connected with the headbolt 20 which like the taper 9 and the drilling tool 8 is provided with a central longitudinal bore. In this way, a continuous coolant conduit is formed which extends into the boring tool.

We claim:

1. A boring unit comprising:
 a rotatably driven spindle,
 a tool support mounted in a bore of said spindle for rotation about an axis of adjustment extending perpendicular to the axis of rotation and including:
  a front recess for receiving a boring tool,
  a rearwardly extending headbolt, and
  a rearwardly extending supporting arm,
 an adjustment member including an inclined wedge surface means engaging said support arm,
 a movable connecting rod operably connected to said adjusting member for moving the same longitudinally so that said wedge surface means imparts rotary movement to said supporting arm and said tool support about said axis of adjustment;
 a chucking cage containing a plurality of balls between which is received a rear portion of said headbolt to secure said tool support, said cage being longitudinally slidable within a bore of said supporting arm such that said balls are engageable with an inclined wall of said supporting arm and thereupon move away from said bolt to release same and permit removal of said tool support,
 spring means for urging said cage in a direction relative to said inclined wall for maintaining said tool support secured,
 said connecting rod being arranged such that continued movement thereof beyond its stroke for rotating said tool support causes said connecting rod to contact and shift said cage longitudinally against the bias of said spring means to release said tool support.

2. A spring unit according to claim 1, including an axial tie rod connected to said cage and carrying a spring bearing, said spring means being mounted on said tie rod and bearing against said supporting arm and said spring bearing, the latter forming a surface against which said connecting rod bears to shift said cage and release said tool support.

3. A boring unit according to claim 1, wherein the direction of inclination of said wedge surface means is such that the tool support is moved in a radially inward direction when the adjustment member travels longitudinally toward said tool support.

4. A boring unit according to claim 1, wherein the said wedge surface means terminates at a point corresponding to the end of the stroke for rotating the tool support, said support arm thereafter engaging a face which is parallel to the rotary axis.

5. A boring unit according to claim 4, wherein said wedge surface means comprises a pair of opposing parallel wedge surfaces between which said supporting arm is disposed, said parallel face extending from only one of said wedge surfaces.

6. A boring unit according to claim 2, wherein said connecting rod, said tie rod, and said headbolt form a bore for conducting a cooling medium to the tool.

7. A boring unit according to claim 6, including a coolant pipe extending into said connecting rod and coupled to said tie rod by means of a telescoping joint, said tie rod being coupled to said headbolt by means of a telescoping joint, for conducting the cooling medium.

* * * * *